United States Patent [19]

Browning

[11] 4,222,680

[45] Sep. 16, 1980

[54] VARIABLE POSITION FRICTION JOINT

[76] Inventor: Charles E. Browning, 10415 SE. 174th, Renton, Wash. 98055

[21] Appl. No.: 883,921

[22] Filed: Mar. 6, 1978

[51] Int. Cl.² .............................................. F16C 11/06
[52] U.S. Cl. ................................. 403/56; 403/90; 403/133
[58] Field of Search ................ 403/56, 90, 133, 135, 403/137; 362/421

[56] References Cited

U.S. PATENT DOCUMENTS

| D. 193,235 | 7/1962 | McNew | D88/3 |
|---|---|---|---|
| D. 197,055 | 12/1963 | Anderson | D13/1 |
| D. 214,226 | 5/1969 | Sewell et al. | D25/02 |
| D. 220,991 | 6/1971 | Riley | D3/03 |
| 596,207 | 12/1897 | Hart | 403/90 |
| 892,105 | 6/1908 | White | 403/90 X |
| 2,715,766 | 8/1955 | Ricks | 403/133 X |
| 2,828,758 | 4/1958 | Moro | 135/5 |
| 2,905,187 | 7/1957 | Croce | 135/46 |
| 3,013,244 | 12/1961 | Rudy | 403/56 X |
| 3,625,553 | 12/1971 | Mattioli | 403/56 X |

FOREIGN PATENT DOCUMENTS

| 857715 | 12/1952 | Fed. Rep. of Germany | 403/135 |
| 2404853 | 8/1974 | Fed. Rep. of Germany | 403/133 |
| 1439959 | 6/1976 | United Kingdom | 403/133 |

Primary Examiner—Wayne L. Shedd
Attorney, Agent, or Firm—Graybeal & Uhlir

[57] ABSTRACT

A variable position friction joint, including a housing defining a housing cavity receiving therein a relatively soft lining material defining a lining cavity. A joint member has a rounded end which is received with a snug friction fit within the lining cavity, said joint member and said housing being selectively movable relative to each other. The joint member and said housing may be tipped relative to each other and/or they may be selectively moved rotationally relative to each other relative to the axis of said joint member. The rounded end of the joint member may include a plurality of valleys in the surface thereof to prevent squeaking of the joint when said joint member and said housing are moved relative to each other. The lining material may comprise either a tubular member defining a cylindrical lining cavity or another member which defines a generally spherical lining cavity. The joint may be used in a shade comprising a base, an elongated arm, and a broad top wherein the aforesaid joint may be utilized in connecting said elongated arm to said base and to said top. The joint may be assembled and disassembled simply by pressing together and pulling apart the various components thereof.

8 Claims, 10 Drawing Figures

U.S. Patent  Sep. 16, 1980  Sheet 1 of 3  4,222,680
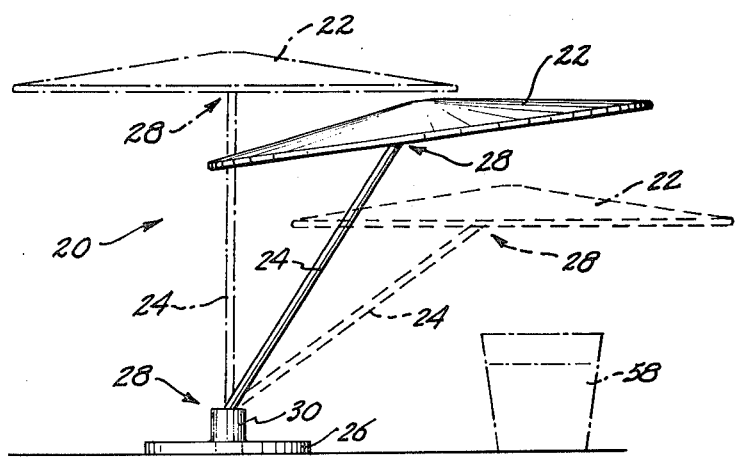
Fig. 1.
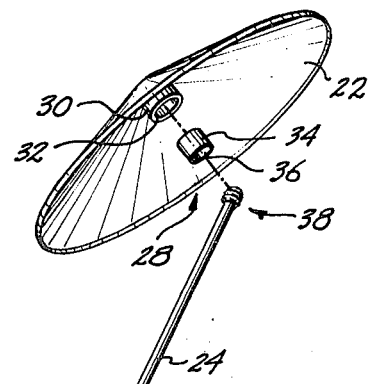
Fig. 3.
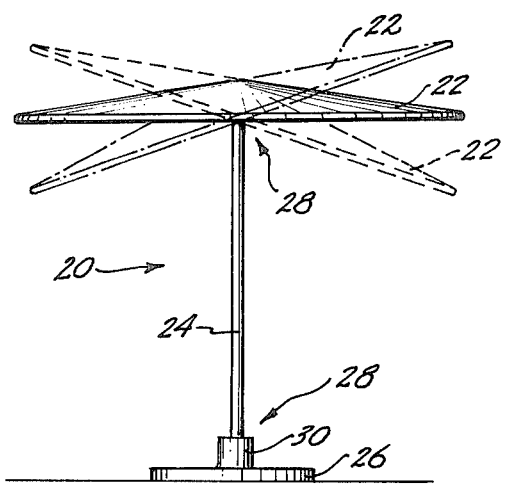
Fig. 2.
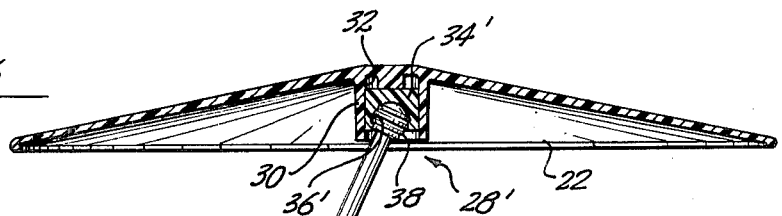
Fig. 4.
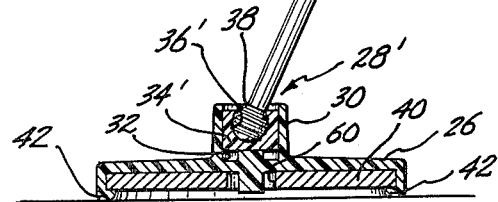

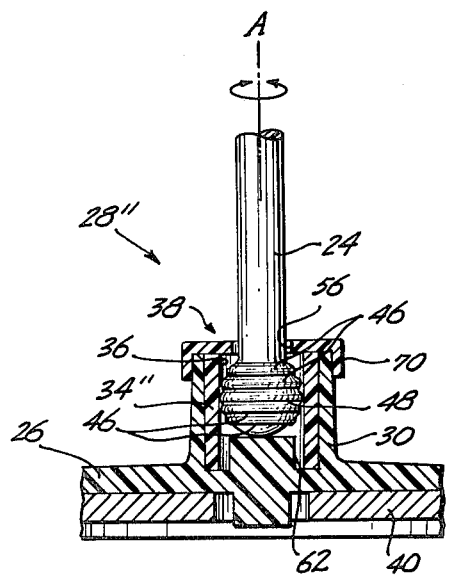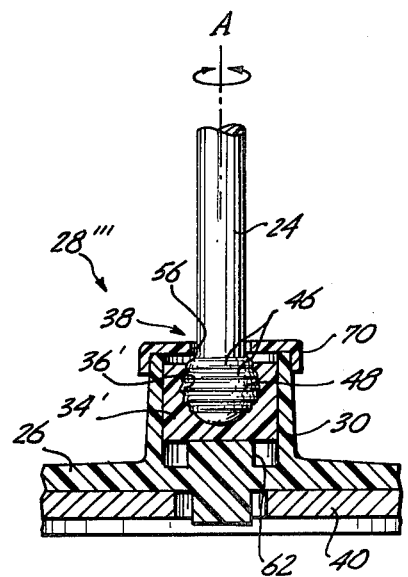

VARIABLE POSITION FRICTION JOINT

BACKGROUND OF THE INVENTION

1. Field of the Invention

This invention relates to friction joints, and more particularly to friction joints wherein there is selective relative movement between a joint member and the joint's housing.

2. Description of the Prior Art

Variable position joints in which the joint member of the joint may be selectively moved with respect to the joints' housing are generally well-known. U.S. Pat. No. 193,235, granted July 10, 1962, to McNew, discloses a joint comprising a yoke-like member which straddles the end of a shaft. A transverse pin, carried by the ends of the yoke, connects the yoke to said shaft with a relatively snug friction fit. However, such a joint permits only one degree of freedom of motion about said transverse pin.

U.S. Pat. No. 2,828,758, granted Apr. 1, 1958, to Moro, discloses a joint 2 which comprises two metal plates 23, 24 between which is sandwiched a rubber disk 25. A pivot 21' holds these elements in association, and when wing nut 22 is tightened on pivot 21', element 23 is held in a fixed angular relation with respect to element 24 by frictional engagement of elements 23, 24 with the rubber disk 25. As is seen, this friction joint is capable of permitting only rotation of element 23 with respect to element 24 about pivot 21'. Clearly this joint is not assembled and disassembled merely by pushing together and pulling apart its various components without the use of tools as in applicant's joint.

Various other forms of shading apparatus are disclosed by U.S. Pat. No. 2,905,187 granted Sept. 22, 1959, to Croce, and U.S. Pat. No. 193,235 granted July 10, 1962, to McNew; 197,055 granted Dec. 10, 1963, to Anderson; 214,226 granted May 20, 1969, to Sewell et al; and 220,991 granted June 22, 1971, to Riley.

SUMMARY OF THE INVENTION

The basic object of the present invention is to provide a variable position friction joint which permits selective tipping of the joint member relative to the joint's housing and/or permits selective relative rotational movement between said joint member and said housing relative to the axis of said joint member. In order to achieve this objective, a variable position friction joint is specified which includes a housing defining a housing cavity which snugly receives therein a lining means. The lining means defines a lining cavity which receives a rounded end of a joint member. The rounded end of the joint member is specified to be sized larger than the corresponding portions of the lining cavity prior to assembly of the joint, so that when the joint is assembled, the rounded end of the joint member compresses some portions of the lining means, resulting in a snug, friction fit between the lining means and the rounded end of the joint member without the use of tools. Compression of the lining means is provided by specifying the lining means to comprise a material softer than the housing and the rounded end of the joint member. It is readily seen that said snug friction fit will permit selective relative movement between said joint member and said housing. Relative tipping between the joint member and the housing may be prevented by specifying the housing to include a cap which relatively snugly encircles the joint member with a sliding contact therebetween.

Other aspects of the present invention specify the lining cavity to be either cylindrical or spherical. In addition, the rounded end of the joint member may be specified to include a plurality of valley portions to prevent squeaking of the joint when the joint member and the housing are moved relative to each other.

A further object of the present invention is to provide a variable position friction joint in which the friction between the lining means and the rounded end of the joint member increases as the amount of relative tipping between the joint member and the housing increases. To achieve this objective, applicant specifies, in certain aspects of the present invention, the rounded end of the joint member to be generally spherical and to include a plurality of valley portions which define therebetween a plurality of higher and lower hills. At least one lower hill is located closer to a plane which passes through the center of the rounded end of the joint member and is located transversely with respect to the axis of the joint member, while at least one higher hill is spaced further away from said plane. As a result, when selective relative tipping between the joint member and the housing increases, said higher hill comes into contact with the lining resulting in greater friction between the rounded end of the joint member and the housing.

It is a further object of the present invention to specify an improved shade of the type including a base, an elongated arm, a broad top, a first joint connecting one end of the elongated arm to the base and a second joint connecting the other end of the elongated arm to the top, wherein at least one of the first and second joints is of the type previously described herein.

It is a further object of the present invention to provide a variable position friction joint which utilizes a minimum of parts, which is wear resistant and which is inexpensive and easily fabricated and assembled. Another object of the present invention is to provide such a joint in which the lining means may be easily replaced to renew the joint should the lining means become worn. A further object of the present invention is to provide the joint previously described which is able to be assembled and disassembled simply by pushing together and pulling apart its various components without the use of tools.

These and other objects, features, advantages and characteristics of the variable position friction joint of the present invention will be apparent from the following more detailed description of the preferred embodiments thereof. It should be noted that the following description of the preferred embodiments is for purposes of illustration only and is by no means to be taken as a limitation upon the scope of the present invention since variations of the invention as disclosed and claimed herein will readily occur to those skilled in the art.

BRIEF DESCRIPTION OF THE DRAWINGS

FIG. 1 is a side elevational view of the shade according to the present invention, showing the elongated arm tilted with respect to the base and showing the top of the shade tilted with respect to the elongated arm in various positions;

FIG. 2 is a side elevational view of the shade shown in FIG. 1, showing the top tilted in various positions with respect to the elongated arm;

FIG. 3 is an exploded isometric view of the shade shown in FIGS. 1 and 2 and showing the parts comprising the friction joint of the present invention;

FIG. 4 is a side elevational view of the shade and another embodiment of the friction joint of the present invention with certain portions shown in transverse cross-section;

FIGS. 9 and 10 are transverse cross sections of alternative embodiments of certain portions of the friction joint of the present invention.

DESCRIPTION OF THE PREFERRED EMBODIMENTS

Figure 5:
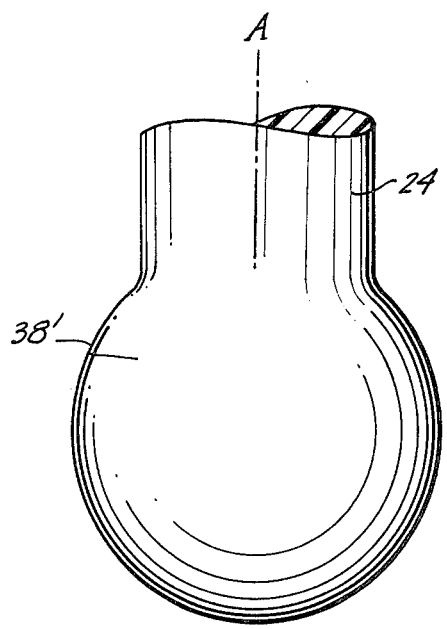
FIG. 5 is a side elevational view of one embodiment of the rounded end of the joint member of the friction joint.

Referring now to FIG. 1, the variable position friction joint of the present invention is shown utilized in a shade, generally designated at 20, including a broad top 22, an elongated arm 24 and a base 26. A variable position friction joint, generally designated at 28, connects one end of the arm 24 to the base 26 and the other end of the arm 24 to the top 22. The variable position friction joints 28 of the present invention permit relative tipping between the top 22 and the arm 24, as well as between the arm 24 and the base 26, as desired by the user. In addition, as will be discussed further subsequently, the variable position friction joints 28 permit relative rotational movement, relative to the axis A of the arm 24, between the top 22, including housing 30, and the arm 24, as well as between the arm 24 and base 26, including housing 30.

As best seen in FIG. 4, the base 26 includes a weight 40 in the form of an annular ring of a heavy material, such as iron, to prevent the shade from tipping over when the arm 24 is tipped to a large degree relative to the base 26. The weight 40 is retained within the base by an annular rim 42. Of course, the weight 42 could be glued or otherwise secured to the base 26, thereby eliminating the need for the rim 42.

In preferred form, the top 22, including housing 30, the arm 24, including rounded ends 38, and the base 26, including housing 30, are injection molded from a plastic which is rigid, strong, durable, lightweight and, if the shade is to be used in the sun, such as to shade a drink 58, as shown in FIG. 1, the plastic should also be resistant to the ultraviolet rays of the sun. A suitable plastic is ABS (acrylonitrile-butadyine-styrene) plastic.

As shown, the top 22 is molded as one piece with the housing 30, however the top and housing could be formed separately and then rigidly secured together as by gluing, by using fasteners, by using a threaded connection or the like. Similar comments apply to the arm 24 and its rounded ends 38, as well as to the base 26 and its housing 30. It should be noted that the base 26 is injection molded with the weight 42 in place, with the weight 42 being provided with a circular aperture 60 which is utilized as to aid in making injection molding of the base 26 and housing 30 more convenient.

Figure 8:
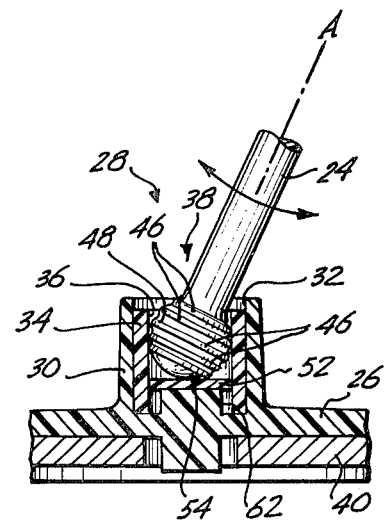
FIG. 8 is a transverse cross section of certain portions of the friction joint of the present invention.

Turning now to the variable position friction joint 28 itself, its preferred form is shown in FIG. 8. As seen, the joint 28 comprises a housing 30 defining a housing cavity 32 snugly receiving a lining 34 which defines a lining cavity 36 which receives the rounded end 38 of the arm 24. It will be understood that the arm 24 is the same as the joint member 24 of the joint 28, the terms being used interchangeably herein. The lining 52 is circular and rests on the projection 62, and the lining 34 rests on the bottom of the lining cavity 36 and is sized as shown.

The lining 34 is a tubular member defining a right angle cylindrical lining cavity 36. The end lining 52, snugly received in the housing cavity 32, contacts both one end of the lining 34 and the lower portion of the rounded end 38 of the arm 24. As seen, the end lining 52 may include a concave depression 54 which enables it to more closely contact, with a friction fit, the rounded end 38 of the arm 24. However, it is to be understood that the end lining 52 is not necessarily required, and could be eliminated if desired.

The linings 34, 52 are formed from a soft, flexible plastic softer than the ABS or other plastic used to form the housing 30 and rounded end 38. A suitable plastic is a vinyl plastic such as type 1957A distributed by the Handcock Gross Corp. of Philadelphia, Pa., having a Shore durometer (A) of about 65. The lining 34 is most easily formed by cutting off a suitable length of an appropriately sized vinyl tubing which is commercially available. The end lining 52 is most easily formed by simple stamping out the desired size from a sheet of vinyl plastic of the desired thickness. The depression 54 in the end lining 52 may be formed by impressing the central portion of the end lining 52 with a suitably heated object having the desired curvature. Alternatively, the linings 34, 52 may be injection moulded from vinyl plastic either separately or as one member.

Turning now to a consideration of the generally spherical rounded end 38 seen, in FIG. 8, to be received by the lining cavity 36 in the lining 34, it is understood that prior to assembly of the joint 38, the rounded end 38 is sized larger in diameter than the lining cavity 36. Thus, when the joint 38 is assembled, the lining 34 is compressed between the rounded end 38 and the housing 30 resulting in a snug friction fit between the rounded end 38 and the lining 34, enabling selective relative movement between the arm or joint member 24 and the housing 30.

As partially illustrated in FIGS. 1, 2, 4 and 8, this snug friction fit permits selective relative tipping in all directions between the arm 24 and the housing 30, limited only when the arm 24 is stopped against the top of the lining 34 or housing 30. Said snug friction fit also permits relative rotational movement through all or part of a full 360° between the arm 24 and the housing 30 relative to the axis A of the rounded end 38. It is to be clearly understood that the aforesaid "relative rotational movement through all or part of a full 360° between the arm 24 and the housing 30 relative to the axis A of the rounded end 38", encompasses not only rotation of the rounded end 38 about its axis A with resulting relative rotational movement between the rounded end 38 and the housing 30, but also encompasses rotation of the housing 30 relative to the rounded end 38 whether or not there is any corresponding change in the amount of tipping between the arm 24 and the housing 30.

Figure 7:
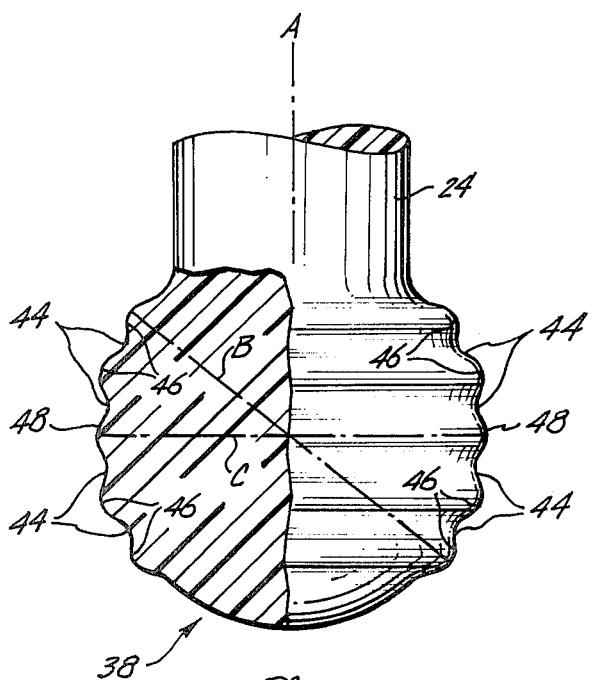

Applicant turns now to a detailed consideration of the form and operation of the rounded end 38 shown in FIG. 8 and more clearly seen in FIG. 7. It will be readily appreciated that if the rounded end 38 of the arm 24 is smooth and spherical as shown in FIG. 5, squeaking will result when there is relative movement between the rounded end 38 and the housing 30. This squeaking can be prevented by providing the valleys 44 and hills 46, 48 shown in FIG. 7. Although the hills 46, 48 are shown to be generally annular and arranged with their planes parallel to each other, and transverse to the axis A of the arm 24, it will be readily appreciated that said hills could be nonannular, such as in the form of spaced bumps on the surface of the rounded end 38 or assume some other configuration which, in view of the disclosures in the present application, will now be readily formulated by those skilled in the art. Applicant theorizes that squeaking is prevented by providing that the valleys 44 are sufficiently deep so that there is little or no contact between the deeper portions of the valleys 44 and the lining 34.

As seen in FIG. 7, the valleys 44 define therebetween a plurality of higher hills 46 and a lower hill 48. The hills 46, 48 are so arranged that they will generally lie at opposite ends of diameters passing through the center of the rounded end 38 of the arm 24, as for example diameters B and C, respectively.

It will also be noted that, with respect to a plane which passes through the center of the rounded end 38 and which lies transverse to the axis A of the arm 24, the lower hills 48 lie closer to said plane than do said higher hills 46.

As can be appreciated, this unique construction of the rounded end 38 shown in FIG. 7 not only prevents squeaking, as previously described, but also results in increased friction between the rounded end 38 and the lining 34 as the amount of relative tipping between the arm 24 and the housing 30 increases. This is because, as will be readily appreciated, such relative tipping brings the higher hills 46 in contact with the lining 34. Of course, the diameters between associated hills 46, 48 are greater than the diameter of the lining cavity 36, with diameter B being greater than diameter C.

By way of nonlimiting example, a description of the sizes of certain elements of the friction joint 28 will now be given. End lining 52 is circular with a diameter of 50/100 of an inch and a thickness of 12.5/100 of an inch. The lining 34 is about 60/100 of an inch high and has an outer diameter of 75/100 of an inch and an inner diameter of 50/100 of an inch. The lining cavity 36 has a diameter of 50/100 of an inch before assembly of the joint and the lining 34 is 12.5/100 of an inch thick. Such being the case, the rounded end 38 is sized slightly larger than the diameter of the lining cavity 36, with the central, lower hill 48 having a diameter C of 53/100 of an inch, while the higher hills 46 have a diameter B of 55/100 of an inch. The maximum width of the valleys is about 8/100 of an inch, with the valleys 44 between higher and lower hills 46, 48 being about 1.5/100 of an inch deep and the valleys between higher hills 46 being about 2/100 of an inch deep.

Turning now to the embodiment of the rounded end 38' shown in FIG. 5, it is understood that it is generally spherical in shape and is sized slightly larger than the lining cavity 36 prior to assembly of the joint. However, this form of the rounded end 38' is not preferred since, as has been mentioned, it tends to squeak when there is relative movement between the joint member 24 and the lining 34. If, for example, the diameter of the lining cavity 36 was 50/100 of an inch, the rounded end 38' would have a diameter of 52/100 of an inch. Thus, if the joint 28 was assembled with rounded end 38', its oversize would compress the lining 34 against the housing, resulting in a snug friction fit between it and the lining 34.

Figure 6:
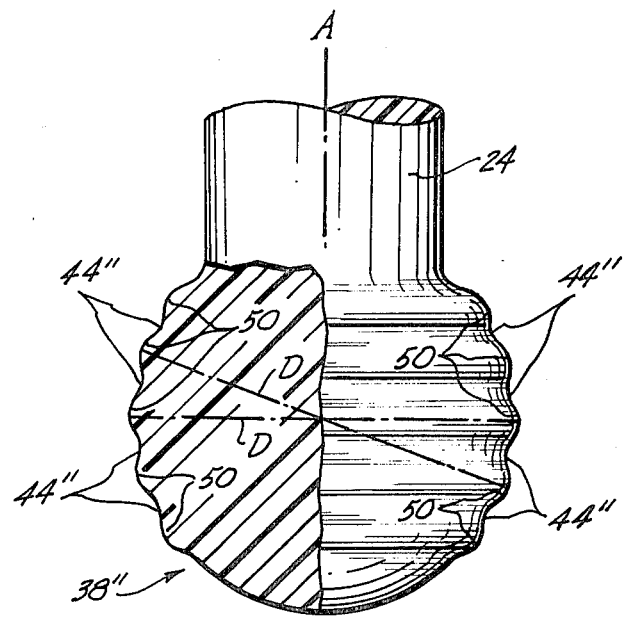
FIGS. 6 and 7 are side elevational views shown partially broken away illustrating other embodiments of the rounded end of the joint member of the friction joint of the present invention.

With respect to the embodiment of the generally spherical rounded end 38" seen in FIG. 6, it is understood that it is similar to the embodiment shown in FIG. 7. It is seen that rounded end 28" includes hills 50 which have, for example, a maximum diameter, such as diameters D, for example, of 53/100 of an inch. The hills define therebetween a plurality of valleys 44" being about 1/100 of an inch deep and 8/100 of an inch wide at their maximum. Rounded ends 38' and 38" are manufactured by injection molding in a way which corresponds to that described with respect to rounded end 38. The hills 50 are slightly larger in diameter than the lining cavity 36, which has a diameter of 50/100 of an inch, thereby compressing the lining 34 against the housing 30 and resulting in a snug friction fit between the rounded end 38" and the lining 34 when the joint 28 is assembled using a rounded end 38".

Assembly of the variable position friction joint and shade of the present invention is best illustrated in FIGS. 3 and 8. The linings 34, and the linings 52 if utilized, are inserted into the housing cavities 32 in the housings 30 of the top 22 and the base 26. Then, the rounded ends 38 of the arm 24 are inserted into the lining cavities 36 of the linings 34. Positioning of the shade is accomplished merely by the user tipping the arm 24 with respect to the housing 30 of the base 26 and/or tipping the top 22 and its housing 30 with respect to the arm 24. Of course, as has been previously described, the arm 24 can also be rotated relative to the housing 30 in the base; and the top 22, and its housing 30, can be rotated relative to the arm 24.

Applicant turns now to the embodiment of the friction joint 28' shown in FIG. 4. As seen therein, the friction joint 28' is identical to the joint 28 shown in FIG. 8 except that the lining(s) 34, 52 have been replaced by a lining 34' having a spherical lining cavity 36'. Assembly and the materials used correspond to those described with respect to FIGS. 1-3 and 5-8. Prior to assembly of the joint, the lining cavity 36' is sized slightly smaller than the rounded end 38 so that when assembled, the lining 34' is compressed between the rounded end 38 and the housing 30 resulting in a snug friction fit between rounded end 38 and lining 34'. Of course, the other rounded ends 38' and 38" could also be used with lining 34' in a way corresponding to the way they were previously described as used with lining 34 in FIG. 8.

Referring now to FIGS. 9-10, alternative embodiments of the friction joint 28 of the present invention are shown in which the axis A of the arm 24 is fixed relative to the housing 30. In this form, it is seen that the housing 30 includes a cap 70 which defines a housing cavity opening 56 sized slightly larger than the arm 24 to receive arm 24 with a relatively snug, sliding contact. Rounded end 38 rests on element 62 as shown. As can be readily appreciated, lateral displacement of the axis A of the arm 24 relative to the housing 30 is prevented, while relative rotation between the arm 25 and the housing 30 about axis A through all or part of a full 360° is permitted. Otherwise, the construction of the joint 28" is the same as joint 28 seen in FIG. 8, except that in joint 28" the end lining 52 is omitted. In addition, the length of lining 34" is increased to be about as tall as the rounded end 38.

FIG. 10 shows a joint 28''' substantially identical to the joint 28" shown in FIG. 9, except the lining 34' replaces the lining 34 and defines a lining cavity 36' which is substantially spherical and corresponds to the lining 34' and lining cavity 36' seen in FIG. 4.

Of course, it is to be expressly understood that any of the rounded ends 38, 38' and 38" could be utilized in any of the friction joints 28, 28', 28" and 28'" shown in FIGS. 1–4 and 8–10. Similarly, any of the joints 28', 28" and 28'" could be used in the shade 20 shown in FIGS. 1–3 instead of joint 28, and any of the linings 34, 34', 34", 52 could be used with any of the rounded ends 38, 38' and 38". Linings 34' and 34" have a composition and are formed as has been previously described with respect to linings 34 and 52.

It will be appreciated that the construction and assembly of the joints 28" and 28'" is somewhat different from the joints 28 and 28' since the housing cavity opening 56 may prevent insertion of the rounded end 38 of the arm 24 as well as the linings 34', 34" through the housing cavity opening 56. Accordingly, for these aspects of the present invention, it is preferred that the cap 70 be molded in two equal halves. Then, to assemble the embodiment shown in FIG. 9, the lining 34" is pressed into the housing cavity 36 and the rounded end 38 is then pressed into lining cavity 36. Then, the two halves of the cap 70 are secured together such as by gluing or the like and are similarly secured to the sides of the housing 30. Assembly of the embodiment shown in FIG. 10 corresponds to that described in FIG. 9.

From the foregoing, various further applications, modifications and adaptations of the apparatus disclosed and the invention embodied therein will be apparent to those skilled in the art to which this invention is addressed, within the scope of the following claims.

What is claimed is:

1. A variable position friction joint, comprising:
   a housing defining an open-ended, cylindrical housing cavity;
   a lining means in the form of a section of elastic tubing snugly received within said housing cavity; and
   a joint member, having a rounded end with annular hills and valleys arranged in the surface thereof generally laterally of the axis of the joint member, wherein:
   said elastic tubing lining means comprises an elastic material softer than said housing and said rounded end of said joint member, and defines a lining cavity receiving said rounded end of said joint member with a snug friction fit;
   at least the hill portions of said rounded end of said joint member being sized larger than the corresponding portions of said lining cavity prior to assembly of said joint, causing said rounded end of said joint member to compress at least some portions of said lining means when said joint is assembled, to provide said snug friction fit and to permit selective relative movement between said joint member and said housing, the open-ended nature of the housing cavity and its elastic tubular lining also enabling the ready assembly and disassembly of the joint simply by pushing the parts together or a pulling of the parts apart, as the case may be.

2. The joint according to claim 1, wherein said housing includes a cap which defines a housing cavity opening in communication with said housing cavity, said housing cavity opening being in a relatively snug sliding contact with said joint member to substantially prevent any lateral movement of the axis of said joint member relative to said housing while permitting selective relative rotational movement between said joint member and said housing relative to said axis of said joint member.

3. The joint according to claim 1, wherein said rounded end of said joint member is generally spherical, having a diameter greater than the adjacent portions of said joint member.

4. A variable position friction joint, comprising:
   a housing defining a housing cavity;
   a lining means snugly received within said housing cavity; and
   a joint member, having a rounded end with annular hills and valleys arranged in the surface thereof generally laterally of the axis of the joint member, wherein:
   said lining means comprises an elastic material softer than said housing and said rounded end of said joint member, and defines a lining cavity receiving said rounded end of said joint member with a snug friction fit;
   at least the hill portions of said rounded end of said joint member being sized larger than the corresponding portions of said lining cavity prior to assembly of said joint, causing said rounded end of said joint member to compress at least some portions of said lining means when said joint is assembled, to provide said snug friction fit and to permit selective relative movement between said joint member and said housing, and wherein there is a plane which both passes through the center of said rounded end of said joint member and is located approximately perpendicularly with respect to the axis of said joint member;
   said rounded end includes a plurality of valley portions to prevent squeaking of said joint when said joint member and said housing are moved relative to each other;
   said valley portions define therebetween a plurality of higher and lower hills;
   at least one higher hill is spaced further away from said plane than at least one lower hill; and
   said at least one lower hill is sized to have a snug friction fit with said lining means, in a first position of said joint member and said housing relative to each other, to ensure that said at least one higher hill provides an even snugger friction fit with said lining means as said joint member and said housing are moved to a second position relative to each other in which they are tipped to a greater degree relative to each other as compared to said first position.

5. In an improved shade of the type including a base, an elongated arm, a broad top, a first joint connecting one end of said elongated arm to the base, and a second joint connecting the other end of said elongated arm to said top; the improvement wherein at least one of said first and second joints comprises:
   a housing defining an open-ended, cylindrical housing cavity;
   a lining means in the form of a section of elastic tubing snugly received within said housing cavity; and
   a joint member, having a rounded end with annular hills and valleys arranged in the surface thereof generally laterally of the axis of the joint member, wherein:
   said elastic tubing lining means comprises an elastic material softer than said housing and said rounded end of said joint member, and defines a lining cavity which receives said rounded end of said joint member with a snug friction fit;

at least the hill portions of said rounded end of said joint member being sized larger than the corresponding portions of said lining cavity prior to assembly of said joint, causing said rounded end to compress at least some portions of said lining means when said joint is assembled, to provide said snug friction fit and to permit selective relative movement between said joint member and said housing, the open-ended nature of the housing cavity and its elastic tubular lining also enabling the ready assembly and disassembly of the joint simply by pushing the parts together or a pulling of the parts apart, as the case may be.

6. A friction joint according to claim 5, wherein said rounded end is formed of ABS plastic or the like and said lining means is formed of vinyl plastic or the like having a Shore durometer (A) hardness of about 65.

7. In an improved shade of the type including a base, an elongated arm, a broad top, a first joint connecting one end of said elongated arm to the base, and a second joint connecting the other end of said elongated arm to said top; the improvement wherein at least one of said first and second joints comprises:

a housing defining a housing cavity;

a lining means snugly received within said housing cavity; and a joint member, having a rounded end, on which is provided a plurality of higher and lower annular hills and valley therebetween, and wherein said lining means comprises a material softer than said housing and said rounded end of said joint member, and defines a lining cavity which receives said rounded end of said joint member with a snug friction fit;

at least the hill portions of said rounded end of said joint member being sized larger than the corresponding portions of said lining cavity prior to assembly of said joint, causing said rounded end to compress at least some portions of said lining means when said joint is assembled, to provide said snug friction fit and to permit selective relative movement between said joint member and said housing;

at least a part of said lining means being substantially tubular and said lining cavity being substantially cylindrical;

the center of said rounded end of said joint member being located in a plane generally perpendicular to the axis of said joint member;

said rounded end of said joint member being generally spherical and including a plurality of valley portions to prevent squeaking of said at least one of said first and second joints when said joint member and said housing are moved relative to each other;

at least one higher annular hill being spaced further away from said plane than at least one lower annular hill; and said at least one lower annular hill being sized to have a snug friction fit with said lining means, in a first position of said joint member and said housing relative to each other, to ensure said at least one higher annular hill provides an even snugger friction fit with said lining means as said joint member and said housing are moved to a second position relative to each other in which they are tipped to a greater degree relative to each other as compared to said first position.

8. In an improved shade of the type including a base, an elongated arm, a broad top, a first joint connecting one end of said elongated arm to the base, and a second joint connecting the other end of said elongated arm to said top; the improvement wherein at least one of said first and second joints comprises:

a housing defining an open-ended substantially cylindrical housing cavity;

a substantially cylindrical lining means in the form of a section of elastic tubing snugly received within said housing cavity; and a joint member, having a rounded end; wherein:

said lining means comprises an elastic material softer than said housing and said rounded end of said joint member, and defines a lining cavity which removably receives said rounded end of said joint member with a snug friction fit;

said rounded end joint member being sized larger than the inner diameter of said lining means causing said rounded end to compress portions of said lining means when said joint is assembled, to provide said snug friction fit and to permit selective relative movement between said joint member and said housing, the open-ended nature of the housing cavity and its elastic tubular lining also enabling the ready assembly and disassembly of the joint simply by pushing the parts together or a pulling of the parts apart, as the case may be.

* * * * *